United States Patent
Hjelm et al.

(10) Patent No.: US 8,738,389 B2
(45) Date of Patent: May 27, 2014

(54) VEHICLE INFORMATION COMMUNICATION

(75) Inventors: Johan Hjelm, Tokyo (JP); Martin Gerdes, Monschau-Rohren (DE); Guido Gehlen, Neuss (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 435 days.

(21) Appl. No.: 12/389,069

(22) Filed: Feb. 19, 2009

(65) Prior Publication Data

US 2009/0306834 A1 Dec. 10, 2009

Related U.S. Application Data (60) Provisional application No. 61/058,961, filed on Jun. 5, 2008.

(51) Int. Cl.
*G06Q 10/00* (2012.01)
(52) U.S. Cl.
USPC .................... 705/1.1; 709/223; 701/36
(58) Field of Classification Search
CPC ...... G06Q 10/00; H04L 29/06; H04L 69/329; B60R 16/0231
USPC .................... 705/1.1; 709/223; 701/36
See application file for complete search history.

(56) References Cited

U.S. PATENT DOCUMENTS

| | | | |
|---|---|---|---|
| 6,725,281 B1 * | 4/2004 | Zintel et al. | 719/318 |
| 7,484,008 B1 * | 1/2009 | Gelvin et al. | 709/249 |
| 2003/0014521 A1 * | 1/2003 | Elson et al. | 709/225 |
| 2003/0073440 A1 * | 4/2003 | Mukherjee et al. | 455/435 |
| 2004/0044454 A1 * | 3/2004 | Ross et al. | 701/33 |
| 2004/0085949 A1 * | 5/2004 | Partanen et al. | 370/352 |
| 2006/0133392 A1 | 6/2006 | Ajitomi et al. | |
| 2007/0073944 A1 * | 3/2007 | Gormley | 710/72 |
| 2007/0195805 A1 * | 8/2007 | Lindgren | 370/401 |

FOREIGN PATENT DOCUMENTS

| | | |
|---|---|---|
| EP | 1 102 454 A1 | 5/2001 |
| WO | WO 01/26338 A2 | 4/2001 |
| WO | WO 01/76154 A2 | 10/2001 |
| WO | WO 2006/045706 A1 | 6/2006 |
| WO | WO 2007/045276 A1 | 4/2007 |
| WO | WO 2007/069942 A1 | 6/2007 |
| WO | WO 2007/071282 A1 | 6/2007 |
| WO | WO 2007071785 A2 * | 6/2007 |

OTHER PUBLICATIONS

"IP Multimedia Subsystem", http://en.wikipedia.org/wiki/IP_Multimedia_Subsystem.*
"IP Multimedia Subsystem", Wikipedia.com, accessed Mar. 12, 2010, <http://en.wikipedia.org/wiki/IP_Multimedia_Subsystem>.*

* cited by examiner

*Primary Examiner* — Scott A Mattia (57) ABSTRACT

A mobile communications device comprising a gateway is provided. The device enables an automated discovery of a vehicle environment is enabled. Hereby context information relating to the vehicle environment can be automatically communicated to the service backend. Also context information from the service backend can be provided to the vehicle environment all utilizing SIP Presence technologies. The invention can in accordance with one embodiment be implemented in an IMS system. In accordance with one embodiment a communications device comprising gateway can be provided in the form of a mobile communications device, such as a mobile telephone. The gateway can for example be an IMS gateway.

15 Claims, 3 Drawing Sheets

VEHICLE INFORMATION COMMUNICATION

CROSS-REFERENCE TO RELATED APPLICATION

This application claims priority from U.S. Provisional Application No. 61/058,961, filed Jun. 6, 2008, entitled DRIVER AND CAR INFORMATION AND CONTROL MESSAGING MEDIATED THROUGH IMS PRESENCE AND PROFILE MECHANISMS, the disclosure of which is fully incorporated herein by reference.

TECHNICAL FIELD

The invention relates to a method for communication between a device in a vehicle and an application server situated remotely from the vehicle.

BACKGROUND

Today, it is possible to control and communicate with a vehicle remotely. It is also possible to collect considerable amounts of information about the driver and the vehicle using established techniques. However, it is difficult to draw relevant and accurate conclusions from these facts automatically, although methods do exist to draw automated conclusions.

In addition, technologies such as UPnP (Universal Plug and Play) for LANs (Local Area Networks) enable device and service discovery and the management of multimedia resources. There are already task forces in various standards bodies, e.g. DLNA (Digital Living Network Alliance) investigating the use of this technology for media consumption in a vehicle.

Furthermore, there are wide-area communications technologies which serve to establish sessions which can be used to control the communications and services between a terminal, such as a mobile telephone, and a network. The 3GPP ($3^{rd}$ Generation Partnership Project) IMS (IP Multimedia Subsystem) is one example of a system providing such technologies.

Also known is a logical device which combines the two technologies, utilizing INS to enable the control of media sessions directed at UPnP devices. This is known as HIGA, Home IMS Gateway. A HIGA is not necessarily a physical device, but a functional component (a piece of software, SW) that can be deployed also on other residential components as the residential gateway or a set-top-box. Different implementations of HIGA systems are for example described in the international patent applications Nos. WO-2006045706-A1, WO-2007045278-A1 and WO-2007071282-A1.

A portable version of a HIGA, implemented in a mobile phone, is known as the PIGA (Portable IMS Gateway or Phone IMS Gateway) and is for example described in WO 2007069942 A1.

Further, one feature of IMS is the ability to establish means for reporting the status of a device, user, group of users or group of devices. Anything which is capable of having a status can send this status information to the IMS system automatically (for instance, triggered by an event), where it can be distributed to subscribing entities, e.g. users. Presence is standardized in several IETF (Internet Engineering Task Force) RFC:s (Request For Comments), OMA (Open Mobile Alliance) documents, and 3GPP Technical Studies.

In the automotive domain various local communication systems, like CAN (Controller Area Network), MOST (Media-Oriented Systems Transport), TTCAN (Time-Triggered CAN) and FlexRay exist that enable the access of vehicle related state and sensor information as well as the control of specific vehicle functions, e.g. regulating brake pressure, fuel injection timing and drawing information on the vehicle dashboard/cockpit display. There are also technologies in place that bridge the car information and control systems with infotainment/consumer electronics systems, like navigation devices and mobile phones.

A problem with existing technologies and solutions is the gap between the vehicle domain, e.g. car sensors/actuators and in-car infotainment systems, and the automotive service providers. In other words, systems resident in the vehicle typically cannot be or are difficult to operate with a given service. An automotive service provider can typically be a centralized functional entity (service) that can be deployed on one or more AS (Application Servers). Examples of automotive service providers are traffic management such as navigation, congestion alerts, local weather reports, infotainment, vehicle maintenance, etc.

However, communications with an automotive/vehicle service requires specialized systems, which is costly although it may have certain advantages, such as QoS (quality of service) guarantee.

SUMMARY

As has been realized by the inventors, the bridging of domains includes a discovery of vehicle and other in-vehicle device capabilities/services, the announcement of the vehicle environment/context information to e.g. automotive service providers, and the establishment of control and user data information channels between the vehicle environment and the automotive service providers (application servers). An automated discovery, configuration and control is essential for a dynamic environment, where portable devices are changing locations and the context of use. The Application Server (AS) can be implemented as an IMS AS, especially by involving a cellular network infrastructure.

Hence, it is an object of the invention to provide an improved way of bridging and communicating information between a vehicle and application servers situated remotely from the vehicle.

This object and others are obtained by the invention as set out in the appended claims. Thus, an automated management of context information from a vehicle communication unit in a vehicle environment to application servers in the Internet is provided. The communication can be provided utilizing Session Initiation Protocol (SIP) presence technologies.

In accordance with one embodiment a method in a communication device for automated device and service configuration of at least one vehicle device located in a vehicle is provided and an application server adapted to store rules associating different context information parameters relating to a driver with parameters/conditions relating to a vehicle is provided. In one scenario the communication device comprises a gateway and discovers one or many vehicle devices of the vehicle. Then the discovered devices are registered in a device database of the communications device. A profile of the vehicle is then established from the registered vehicle devices including status information of the vehicle device(s). The communication device is then registered with a vehicle external network, and a session between the vehicle device and the application server using the communications device as a network interface between the vehicle device and the application server is set up. Vehicle registration comprising a user identity and a profile of the vehicle and/or identity information about the vehicle is then sent to the application server, and an update message to the application server is sent when the vehicle registration and communications device are registered in the network.

The communication can in accordance with one embodiment be provided via a context information management application server in an operator service network. In accordance with one embodiment the management of context information is deployed in an IMS infrastructure.

The automated management of context information can comprise:
- discovery of available access technologies in a vehicle and an automated connection setup of any discovered access technology,
- discovery of devices and their services within the vehicle environment. Such devices and services can include but are not limited to: entertainment appliances/devices certified by DLNA, sensor devices such as a tachometer, a temperature sensor, a positioning system module such as a GPS module, and other devices connected to an internal vehicle network bus, such as a CAN-bus of the vehicle. The discovery can for example be triggered when (a) a control device such as a PIGA, roams into the vehicle environment, or when (b) any device is added to or taken from the vehicle environment,
- automated retrieval of device and service descriptions,
- automated retrieval of certain context data from corresponding devices utilizing their service descriptions (speed, temperature, location, fuel consumption etc),
- automated connection setup with a context information management application server,
- automated exchange of context information with a context information management application server including provision of context information from a vehicle; and requesting, receiving and handling context information from a service backend,
- automated provision of remote context information to devices in the vehicle, Context information can for example be any of:
- device characteristics, capabilities, status, for example UPnP device description documents;
- service descriptions, requirements, capabilities, for example UPnP service description documents and XML (extensible markup language) Web Service descriptions (WSDL-documents);
- vehicle context information, for example location, speed, temperature, fuel consumption etc.;
- user context information, for example user presence, user preferences, user contacts etc.

By using the method device and computer program as described herein an automated discovery of a vehicle environment is enabled. Hereby context information relating to the vehicle environment can be automatically communicated to the service backend. Also context information from the service backend can be provided to the vehicle environment all utilizing SIP (based/utilized) Presence technologies. The invention can in accordance with one embodiment be implemented in an IMS system.

In accordance with one embodiment a communications device comprising gateway can be provided in the form of a mobile communications device, such as a mobile telephone. The gateway can for example be an IMS gateway.

In accordance with one embodiment a communications device comprising gateway can be provided in the form of a vehicle network node embedded in the vehicle. The gateway can for example be an IMS gateway.

In one embodiment the discovery of a vehicle device such as a non-INS device can be performed via wireless communication.

In one embodiment the vehicle device can be a node in a vehicle network.

The communication between the mobile communications device and the vehicle device can for example be performed with UPnP messages or Bonjour messages. Also the profile of the vehicle can be updated every time a connection is established, depending on the profile information.

The invention also relates to a mobile communications device, such as a mobile telephone, a PDA or a laptop, comprising a gateway, such as an IMS gateway adapted to perform the method as et out above. For example a PIGA can be provided. The mobile communication device can be adapted to enable communications between at least one node in a vehicle network and an application server such as an IMS server. The mobile communication device may comprise a UPnP IMS gateway operative to translate incoming UPnP-messages from at least one vehicle-internal node to IMS compatible SIP (Session Initiation Protocol) messages.

The invention also relates to an application server, enabled to operate in accordance with the above.

The invention also extends to a computer program and a computer program product, which can be deployed and executed on a mobile communications device, e.g. in the form of a mobile communication device, thereby enabling the above method.

The invention provides numerous advantages for professional automotive services, such as centralized fleet management services, to be provided with a 3G ($3^{rd}$ generation) communications system and of course future systems such as fourth generation communication systems including Long Term Evolution, LTE, systems as well as long as they support SIP communication technologies, also for non-professional users and in a standardized way.

An advantage of the invention is that both, the combination of vehicle and driver, as well as the combination of these two with external conditions, can be taken into account, which is hard if not impossible to do in current technologies. This is also done using standard techniques, e.g. using SIP presence. Furthermore, a common platform can be used to provide vehicle context information to multiple application servers, without the requirement of separate, independent communication sessions for the exchange of potentially widely overlapping information, leading to (i) higher communication efficiency, (ii) development, deployment and operation of a broad set of services utilizing well defined interfaces to get the extended context information, and (iii) flexible, automated way to deliver the services to appropriate vehicle devices.

BRIEF DESCRIPTION OF THE DRAWINGS

The invention will be more readily understood from the following detailed description of exemplary embodiments of the invention when read together with the accompanying drawings, in which.

DETAILED DESCRIPTION

While the invention covers various modifications and alternative constructions, embodiments of the invention are shown in the drawings and will hereinafter be described in detail. However it is to be understood that the specific description and drawings are not intended to limit the invention to the specific forms disclosed.

In an embodiment of the invention, presence and group management information is combined with a decentralized device and service discovery and control technology, like UPnP or Bonjour, to establish the combination of the vehicle networks with automotive service providers. When a driver enters a vehicle, such as a car, truck and bus, his mobile communication device such as a cellular gateway in the form of a PIGA discovers the vehicle environment, e.g. DLNA/UPnP enabled devices in the vehicle, and sets up a session with an IMS. In the course of doing so, the PIGA checks the user profile for each detected device and service for the definition which device and service can be exposed to the IMS Presence Server/service (PS). In addition, the PIGA has the ability to aggregate services or context information, i.e. aggregating the complete public service presence information coming from different devices to one presence object. The presence object reflects the overall context of the in-vehicle environment that the user likes to publish to the IMS Presence Server/service.

IMS, specifically IMS presence and group management, is in accordance with one embodiment used as the primary protocol for updates from within the sensor and entertainment nodes in the vehicle network and the servers outside the vehicle, such as a Fleet Management AS discussed below. Other servers which communication is established with, and which can adapt the information sent to the vehicle network by using the information retrieved from the Presence and Group Management Server in IMS, are e.g. traffic congestion monitoring AS, navigation AS, speed control AS, driver teaching AS (i.e. applications that teaches a driver to e.g. drive more environmental friendly).

Services, e.g. Telematics enabled services, are able to subscribe to the presence information from the distributed vehicle environment. These services are in a second step able to configure or adapt the service consumption in the vehicle, adapted to the driver/vehicle context and using the in-vehicle device environment. For example, the PIGA may detect inside the vehicle a portable navigation device providing GPS location, speed and heading information, and an UPnP MR (Media Renderer) service (providing Display and Audio Output). After announcing this information to a presence server in the IMS infrastructure, or to an involved AS respectively, the automotive service providers are able to retrieve the vehicle's location, speed and heading information. Based on this information, the AS can push location specific information (e.g. traffic state, road traffic alerts, general advertisements and position based advertisements . . . ) to the portable navigation device that is connected through the PIGA.

These ASs can be IMS ASs (i.e. AS:s which can be contacted via IMS, such as SIP AS:s, CAMEL (Customized Applications for Mobile networks Enhanced Logic) AS:s and OSA (Open Service Access) AS.s) which use both the presence information from the vehicle and the user, as well as profile information such as e.g. driver preferences, vehicle capabilities, etc, and external information like context information, such as weather, road condition, temperature, and calculate the optimizations appropriate for the particular vehicle-driver combination, and send them to the vehicle to indicate the appropriate settings. These optimizations can include e.g. passing through download hotspots, which may be geared towards the media usage habits of the user (for instance, if a particular chain of filling stations offer a certain kind of music, for instance hard rock, the vehicle can select a route which passes these stations to optimize the automated download opportunities). In one exemplary embodiment, the system can be adapted to optimize the route after the playlist of the user, so that he has time to listen to all the songs while driving.

The appropriate settings for the vehicle are sent through an event management mechanism of the presence system, i.e. change of condition=>event=>presence message=>evaluation/new recommendation=>response message. This can be done at any time during the IMS session between the vehicle and the IMS system, based on (potential) changes in conditions reported to the Fleet Management AS. Note that this does not necessarily imply fleet control/management in the professional sense such as a Fleet management system for haulage contractors, bus fleet contractors and taxis services.

The embodiment provides the use of IMS technologies to communicate information to, and manage information from, the Fleet Control AS ε using the IMS Presence system. IMS Presence and Group Management (PGM) are used for presence and profile management. IMS is also used for authorization and authentication. The Presence server is shown as δ1 and the Profile server as δ2 in FIG. 1.

Figure 1:
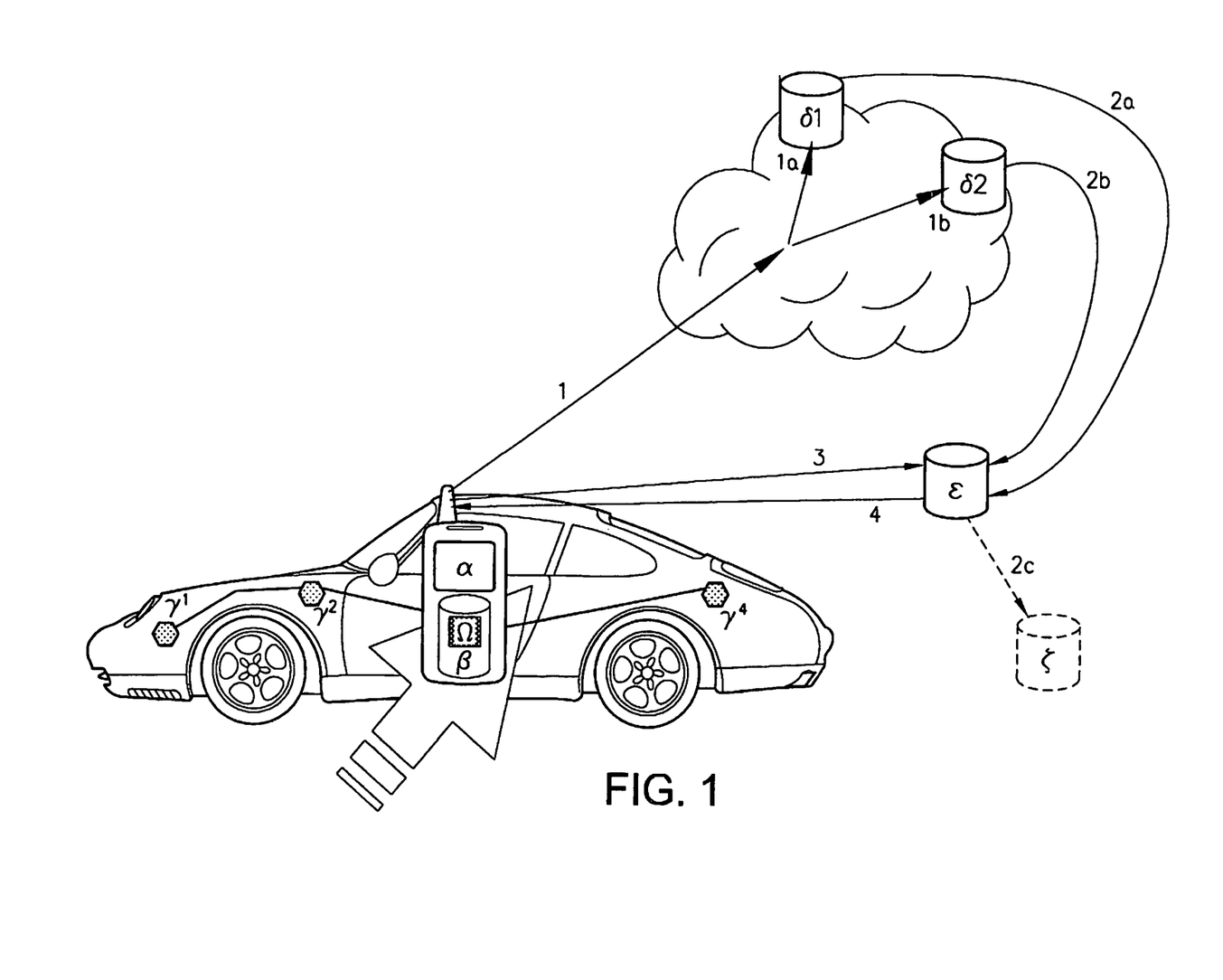
FIG. 1 shows a schematic view of a system configuration.

An embodiment of the invention shows a vehicle which communicates internally using UPnP (shown in FIG. 1 as nodes γ1 to γ4). In other words in the exemplary system depicted in FIG. 1 there is an vehicle network with UPnP devices. This is one of many possible embodiments. Alternative embodiments can use a number of different simultaneous interfaces to support different vehicle networks. This may for instance include the external bus interface on the telephone/telematics device connecting to the communications bus of the vehicle; a Bluetooth interface interfacing with some types of sensors; an infrared interface interfacing with other types of sensors, and a USB or RS-232 interface to nodes/buses in the vehicle network.

For example when the network in the vehicle uses UPnP, the functionalities developed for interfacing UPnP networks with IMS—the HIGA—can be applied. It is possible that this can be used from a built-in terminal in the vehicle, e.g. a mobile module or gateway with IMS termination (which could be a separate node in a vehicle network or a part of a telematics node).

In the below description it is however assumed that the vehicle does not have an external communications interface of its own, but communicates through a mobile network interface in the mobile station, e.g. a mobile phone. Hence, a PIGA functionality is needed to mediate between the in-vehicle sensor and entertainment network and the IMS network outside the car.

Below an Exemplary Scenario is Described:

First a user associated with a PIGA, e.g. a mobile station a comprising a PIGA β, enters the vehicle. When entering the vehicle the PIGA β in the mobile station α discovers vehicle devices γ, such as vehicle network/nodes in the vehicle network of the car, and the different nodes in it. The discovery of in-vehicle devices γ typically includes the retrieval of descriptions of functions and services that are offered by each device γ, including accessibility within the vehicle network, service capabilities, service access interface (parameters, protocols), status etc. An example for the considered types of device and service discovery information is UPnP device and service description documents, but the discovery of in-vehicle devices typically also covers non-UPnP nodes. The above mentioned device and service information for all discovered nodes is stored in a device database $\Omega$ of the PIGA. Also a profile of the vehicle is determined based on the discovered nodes in the vehicle network and their device and service descriptions and status information. The device database $\Omega$ in the PIGA $\beta$ is updated each time a new device is discovered (e.g. a node within the vehicle network is switched on), when a node is switched off, or whenever any kind of event indicates a change of the status of any node or any of the services it provides. This vehicle profile is in accordance with one embodiment updated every time a connection is established, depending on the latest device and service information in the device database of the PIGA.

One possible implementation for the vehicle profile is to provide the complete device and service description and status information from the PIGA device database as a UPnP vehicle profile. The vehicle would define one UPnP device, aggregating various non-UPnP in-vehicle nodes (such as sensor or actuator systems connected through the CAN). The functions and services carried out by each device can for example be part of the UPnP service description of the UPnP vehicle device. In such an embodiment, the UPnP vehicle profile of the vehicle will contain all non-UPnP device properties, service descriptions and status information, and will represent the whole vehicle specific environment as a single, discoverable UPnP device.

When the in-vehicle sensor and entertainment nodes have been discovered, and a vehicle profile has been established based on their device and service descriptions and status information, the PIGA registers with the IMS network (a+b) as indicated by 1 in FIG. 1. The registration typically contains both the user identity and the profile of the vehicle or, alternatively, identity information about the vehicle, if the profile information is already sufficient.

In response to a registration, i.e. when the vehicle and the user are registered in the network, the Fleet Management/Control AS $\epsilon$ (a+b) can be updated. Further the Fleet Management AS $\epsilon$ can be pre-programmed with rules setting out driver behavior(s) appropriate for a particular vehicle. The application of the rules can also be set to depend on external conditions, which can be retrieved from the external conditions databases $\zeta$ as well as the vehicle network and other sensors connected to the PIGA $\beta$. The external conditions can include factors such as current traffic conditions, current temperature, predicted traffic conditions and weather, current and predicted gasoline prices, and similar. In accordance with one embodiment, the system can use a standardized language, such as BPEL (Business Process Execution Language), for any such rules. The rules can be input to the system or the rules can be automatically determined from the history of the driver and the vehicle. This assumes that the profile and presence information are expressed in a machine-understandable or at least machine-readable format.

When the PIGA $\beta$ in the mobile phone a has registered its presence etc, it sets up an IMS session between itself and the Fleet Management AS $\epsilon$, using the mobile phone as the network interface.

In response to a set up IMS session, the Fleet Management AS $\epsilon$ can be adapted to send control messages to the vehicle over the now established session. The formats of these messages can be of any suitable format and are not in the scope of the invention. However, in one embodiment, the messages can be directed to the various in-vehicle sensor and entertainment nodes, and they can contain recommendations or instructions for the engine revolutions, energy recovery algorithm while braking, pressurized air pressure, engine temperature, etc. Furthermore, the recommendations can be displayed to the driver either as part of the dashboard of the vehicle or on a heads-up display; or on a display such as the navigation system which is connected to the PIGA. Different settings for a driver's seat, in order to suit a predetermined, preferred driving position for the driver, could also be sent from the AS the vehicle via the PIGA so that such settings does not have to be stored in the vehicle or a smart card. This is especially beneficial for a haulage contractor with many vehicles having substantially the same cab configuration. The display can be either connected to the PIGA or a part of the regular information display of the vehicle. To ensure that the recommendations, as well as the messages concerning the vehicle status, reach the PIGA $\beta$ in the vehicle, and the Fleet Management AS $\epsilon$ in the IMS system respectively without network latency interfering with the applicability of the messages (i.e. making them late and hence unusable), the IMS QoS mechanisms can be applied.

The combination of the recommendations for these parameters, the general condition of the vehicle, and the driver behavior enable improvements in driving. These may be with regards to speed; fuel consumption; wear and tear; driver satisfaction; alertness etc. The algorithm and method for determining which optimization should be guiding is not as such regarded as part of the invention and therefore not described more in detail. BPEL is a language where it is possible to express almost any reasonable condition.

Furthermore, it should be possible to sign and/or encrypt the control messages. After establishing the session, encryption keys can be exchanged using standardized methods. It is also possible to pre-provision keys and certificates, in essence establishing a trust relationship in advance. Also, the presence information can be updated with appropriate notifications from the vehicle and regarding the user behavior, and logged. This information can be used to derive the user behavior, and predict future behavior, especially when related to position.

As described above, a server in the IMS network can be configured to take into account the individual driver (e.g. his preferences and condition), the specific vehicle (e.g. its capabilities and condition), and external conditions (context information, e.g. temperature, road condition, etc). This server has been named the Fleet Management AS $\epsilon$ herein but may of course be any kind of AS that could be utilized for improvements in driving as exemplified above.

Figure 2:
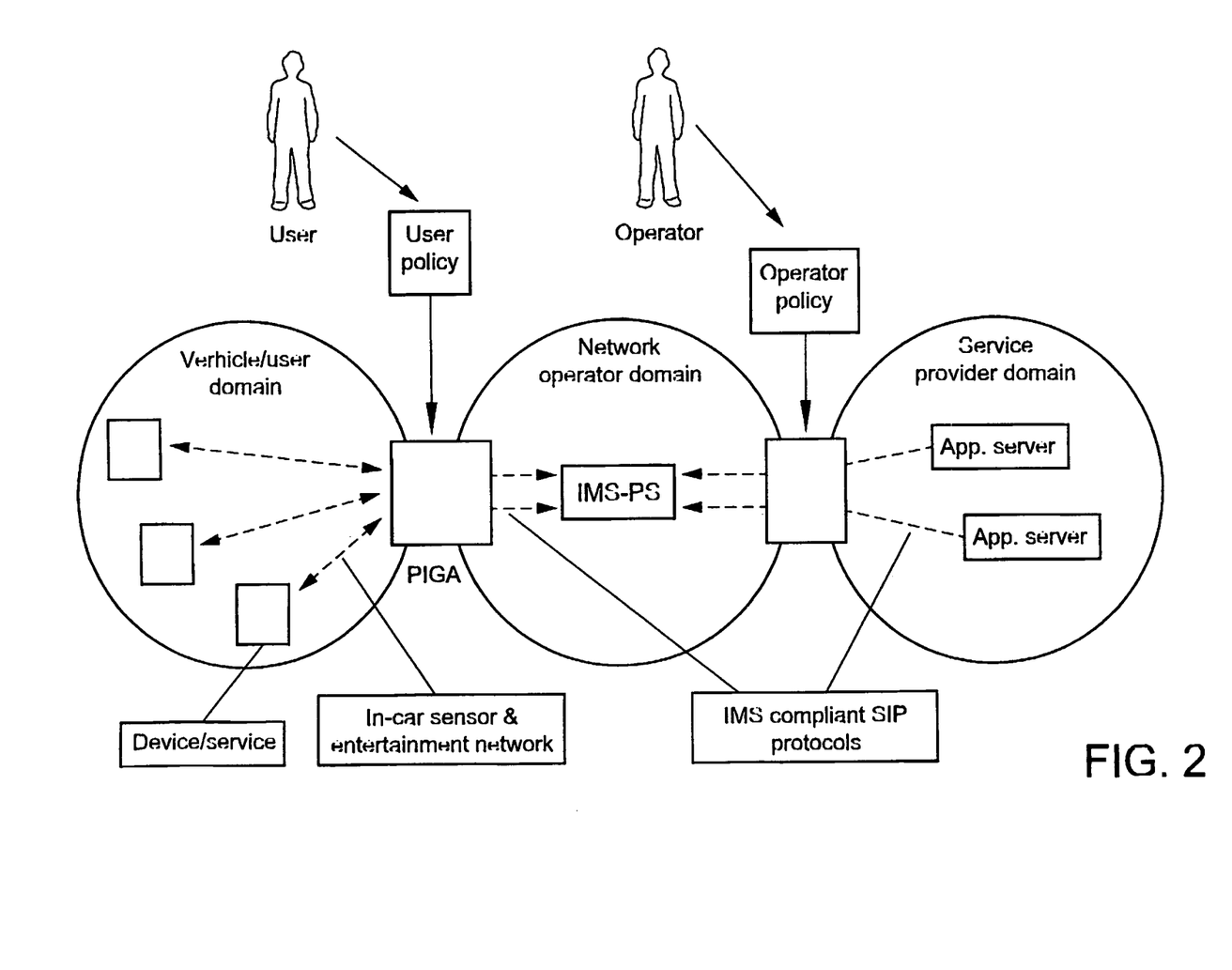
FIG. 2 is a view showing different domains of a system in accordance with the invention.

In FIG. 2 a view illustrating the different domains of the system depicted in FIG. 1 is shown. Hence, the communication device, for example a PIGA, provides an interface for the vehicle devices in the vehicle domain to a network domain. The network domain is in turn connected to different application servers in a service domain.

Figure 3:
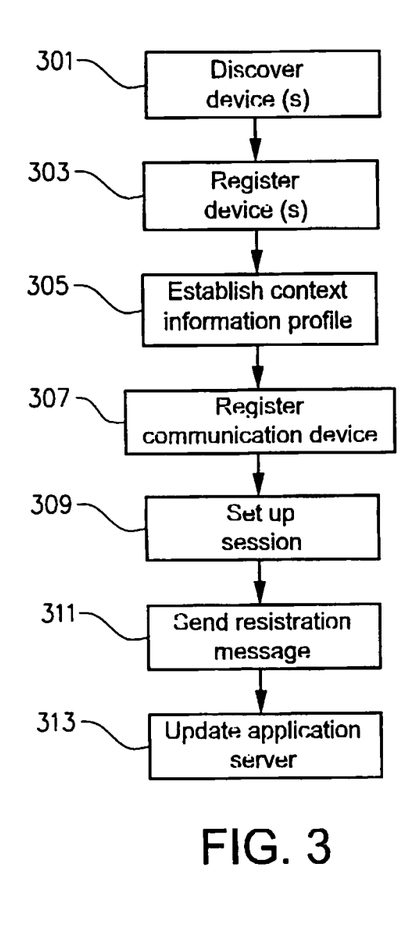
FIG. 3 is a flow chart illustrating procedural steps performed when providing automated device and service configuration of least one vehicle device located in a vehicle and an application server, and, FIG. 4 is a flow chart illustrating procedural steps performed in an exemplary scenario.

In FIG. 3 a flowchart illustrating procedural steps in accordance with one embodiment of the invention are shown.

First in a step 301 a vehicle device(s) located in a vehicle is discovered using a communications device comprising a gateway. Next, in a step 303 the vehicle device(s) are registered in a device database $\Omega$ of the communications device, Thereupon, in a step 305, a profile of the vehicle from the vehicle device(s) is established and status information is obtained for the vehicle device(s). Next, in a step 307, the communications device is registered in a network. Thereupon, in a step 309, a session is set up between the communications device and an application server using the communications device as a network interface between the vehicle device and the AS. Then, in a step 311, a vehicle registration message is sent from the communication device to the application server. The registration message comprises a user identity and a profile of the vehicle and/or identity information about the vehicle to the application server. The application server is then in a step 313 updated when the vehicle registration and communications device are registered in the network.

Below an exemplary scenario is described in more detail. Hence, the automated decision making in the Fleet Control AS ε, can in accordance with one embodiment be performed as follows with reference to FIG. 4.

Figure 4:
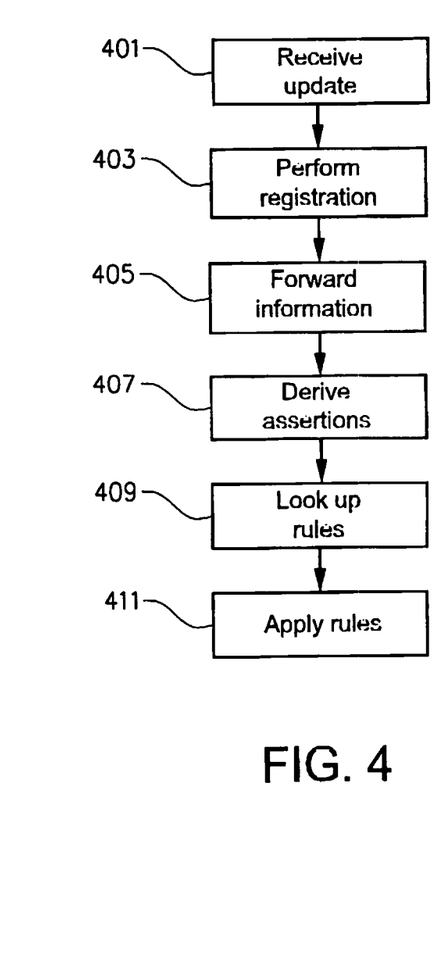

First in a step 401 The Fleet Control AS ε receives an update that the PIGA β, and hence the user and the vehicle with its attendant sensor, actuators and entertainment components, are registered in the IMS network H.

Registration is then performed in a step 403 via Presence Watcher F in the Fleet Control AS ε receiving the presence information from the Presence Server G2 over the ISC (IMS Service Control) interface from the IMS Client D.

In response to a registration performed when the Presence Watcher F receives the updated presence information, information is forwarded to an Assertion Engine C in a step 405.

The Assertion Engine C can be adapted to derive the assertions relevant to the presence information from the rich presence information document and hands the derived assertions to the Rules Engine A in a step 407.

Next a Rules Engine A looks up the rules relevant for the present user in a Profile Database B in a step 409. In accordance with one embodiment the Profile Database B is pre-programmed with rules for which driver behavior is appropriate for which vehicle. These rules can be pre-provisioned and provided in a rules language, e.g. BPEL. In another embodiment, f the Profile Database B has not been pre-provisioned with rules, it can be adapted to requests the rules from a personal profile database G1. This can for example be performed by an IMS client H over an ISC interface, using for example XCAP (XML Configuration Access Protocol) to retrieve the profile from s XDMS (XML Document Management Server).

Next, in a step 411, the Profile Database B hands the rules to the Rules Engine A, which applies the personal rules of the user to the assertions derived from the presence information to conclude a set of recommendations which are sent to the user via the IMS client H over the ISC interface via the Presence Server G2. The application of the rules can be predicated on external conditions, which can be retrieved from the external conditions databases ζ. The external conditions can include factors such as current traffic conditions, current temperature, predicted traffic conditions and weather, current and predicted gasoline prices, and similar. Position information can for example be one such information item.

The method in accordance with the invention can be software implemented by a computer program product comprising computer program segments enabling a computer to perform the method in accordance with the above. As is stated above in one embodiment the PIGA β is implemented using a computer program product. The PIGA can then correspond to a computer program that is executed in a mobile station α. Also, the computer program product can be stored in a memory such as a ROM, hard disk, flash memory, EEPROM or the like.

Below an exemplary scenario is described in more detail. When a PIGA registers in the IMS network, thereby registering the user and the vehicle network, it is adapted to publish the information about the user and the vehicle. This can include the amount of fuel in the tank and the driving pattern of the user. Based on this the Fleet Management AS calculates the driving distance until the user has to fill the tank.

Having calculated the driving distance, the Fleet Management AS compares the result with the destinations, and computes a route. To simplify the route calculation, this can be done for all user-vehicle pairs simultaneously, and as a result, the drivers allocated to the vehicles. To work, this would have to be done in advance of the user getting the vehicle, though. In other words when there are multiple vehicles with different destinations, and multiple drivers with different driving patterns, the Fleet Control AS can take the different vehicle context information (petrol usage, destination) and driver context information (driving pattern) into account to calculate optimized routes and driver-vehicle pairs.

During the driving, the user might experience unforeseen circumstances, such as an accident. This will cause a need to recomputed the route, and re-route the user to a closer filling station. It may also require re-routing another user to some of the first user's destination. This can be done dynamically, and the information distributed to the users using the IMS Presence mechanism.

In accordance with one embodiment a user is required to register his driving pattern. This can be done automatically, for example by logging his behavior while driving, and deducting the driving patterns which the user will expose under different traffic and road conditions.

In accordance with one embodiment a coherent profile of the vehicle has to be created. Certain types of vehicles are conducive to certain types of behavior. For instance, a car with manual gears is conducive to a different set of driving behavior than a car with an automatic or semi-automatic gearbox.

In accordance with one embodiment a mobile phone equipped with a portable HIGA (a PIGA) is used. This is shown in FIG. 1 as β. The mobile phone is used to establish a wireless communication link between the vehicle network and the service infrastructure.

In the above examples IMS is utilized. However it should be stated that it is not required to use IMS but other implementations are possible. For example a pure SIP environment can be used.

In accordance with one embodiment the enhanced context information management functionality can be delayed in a mobile phone (PIGA) that is take by the user into the car, or in an application gateway component (CIGA—Car EMS Gateway), that is inbuilt in the car. The gateway can for example be collocated with an embedded communication module in the car.

In accordance with one embodiment the vehicle owner/PIGA user in the vehicle is enabled to control/define which elements of the whole set of context information that is published.

The context information provided by the vehicle, potentially via a context information management application server, can be utilized by service providers such as a Fleet Control AS in a number of different ways.

For example a navigation service provider (SP) can use context information from a car, such as local traffic situation, weather conditions and user/driver parameter, such as preference regarding street type, planned destination, intermediate stops/breaks, to calculate an optimized, adaptive route, also taking the overall traffic situation (known by the navigation SP) into account. In another scenario an online media service provider can utilize context information about media devices in the car, controlled by or via a PIGA, to deliver media services such as music, radio, IPTV, in an optimized way to feasible media devices in the vehicle environment.

In another exemplary scenario a recommendation of media content provided/delivered to the user can take context information into account as user preferences, driving context such as speed, traffic situation for example a traffic jam.

In yet another exemplary scenario vehicle context information such as location, problem status, or even breakdown information can be utilized by a vehicle maintenance and/or breakdown support SP to make recommendations. The recommendations can relate to different things such as next/optimal maintenance/support center and provide routing info, or to request and guide support personal automatically to the breakdown location.

In accordance with one embodiment adaptive insurance conditions/tariffs based on context information including but not limited to region, speed, and times, can be provided and enforced by an Application server connected to the system as described herein. Also road charges can be based on context supported based on location and time information from the car.

Further a server in the IMS network can be configured to take into account the individual driver and his preferences and condition, the specific vehicle including its capabilities and condition), and external conditions such as context information, temperature, road condition, etc. This server can be configured to draw these conclusions when presented e.g. with the fuel cost using e.g. BPEL. It is shown as $\epsilon$ in FIG. 1. The external conditions are shown as an optional component $\zeta$. This server has been named the Fleet Management AS $\epsilon$ or Fleet Control AS in this description.

The invention claimed is:

1. A method in a communication device for automated device and service configuration of a plurality of non-Universal Plug and Play (UPnP) devices located in a vehicle, the method comprising the steps of:
   discovering the plurality of non-Universal Plug and Play (UPnP) devices using the communication device, wherein the communication device comprises a gateway,
   registering the plurality of non-UPnP devices in a device database of the communication device,
   establishing, within the communication device, a UPnP vehicle profile of the vehicle from the plurality of non-UPnP devices and obtained status information of the plurality of non-UPnP devices, and
   sending, by the communication device, a vehicle registration to an IP multimedia subsystem network, wherein the vehicle registration comprises a user identity and the UPnP vehicle profile of the vehicle, wherein the UPnP vehicle profile identifies a discoverable Universal Plug and Play (UPnP) device defined by aggregating the plurality on non-UPnP devices, wherein device properties, service descriptions and status information of the plurality of non-UPnP devices are part of a UPnP service description of the discoverable UPnP device.

2. The method according to claim 1, wherein the UPnP vehicle profile is updated according to context changes of a driver, a passenger, the vehicle or the plurality of non-UPnP devices.

3. The method according to claim 1, wherein the communication device is a mobile telephone.

4. The method according to claim 1, wherein the gateway is an IP Multimedia Subsystem Gateway.

5. A mobile communications device comprising a gateway, the mobile communications device further comprising:
   a computer;
   a non-transitory computer-readable storage medium with an executable computer program stored thereon and executed by the computer to perform following operations:
   discovering a plurality of non-Universal Plug and Play (UPnP) devices,
   registering the plurality of non-UPnP devices in a device database of the mobile communications device,
   establishing, within the mobile communications device, a UPnP vehicle profile of the vehicle from the plurality of non-UPnP devices and obtained status information of the plurality of non-UPnP devices, and
   sending a vehicle registration to an IP multimedia subsystem network, wherein the vehicle registration comprises a user identity and the UPnP vehicle profile of the vehicle, wherein the UPnP vehicle profile identifies a discoverable Universal Plug and Play (UPnP) device defined aggregating the plurality on non-UPnP devices, wherein device properties, service descriptions and status information of the plurality of non-UPnP devices are part of a UPnP service description of the discoverable UPnP device.

6. The mobile communications device according to claim 5, wherein the UPnP vehicle profile is updated according to context changes of a drive, a passenger, the vehicle or the plurality of non-UPnP devices.

7. The mobile communications device according to claim 5, wherein the mobile communications device is a mobile telephone.

8. The mobile communications device according to claim 5, wherein the gateway is a portable IP Multimedia Subsystem Gateway.

9. The mobile communications device according to claim 5, wherein the mobile communications device is configured to perform communication using a Session Initiation Protocol.

10. The mobile communications device according to claim 5, wherein the mobile communications device is configured to connect to an IP multimedia subsystem server.

11. A non-transitory computer-readable storage medium with an executable computer program product stored thereon and adapted to be executed on a computer of a mobile communications device comprising a gateway, the computer program product comprising computer program segments that when executed on the computer enables the mobile communications device to:
   discover a plurality of non-Universal Plug and Play (UPnP) devices in a vehicle,
   register the plurality of non-UPnP devices in a device database of the mobile communications device,
   establish, within the mobile communications device, a UPnP vehicle profile of the vehicle from the plurality of non-UPnP devices and obtained status information of the plurality of non-UPnP devices, and
   send, by the mobile communications device, a vehicle registration to a cellular network, wherein the vehicle registration comprises a user identity and the UPnP vehicle profile of the vehicle, wherein the UPnP vehicle profile identifies a discoverable Universal Plug and Play (UPnP) device defined by aggregating the plurality on non-UPnP devices, wherein device properties, service descriptions and status information of the plurality of non-UPnP devices are part of a UPnP service description of the discoverable UPnP device.

12. The non-transitory computer-readable storage medium according to claim 11, wherein the computer program product further comprises computer program segments for updating the UPnP vehicle profile according to context changes of a driver, a passenger, the vehicle or the plurality of non-UPnP devices.

13. The method according to claim 1, further comprising a step of registering the communication device with a presence server in the IP multimedia subsystem network during which presence information including the UPnP vehicle profile and user identity are published to the presence server, wherein a plurality of application servers have subscribed to receive the UPnP vehicle profile and user identity from the presence server such that independent communications sessions do not need to be established between the communication device and each of the application servers to exchange the UPnP vehicle profile.

14. The mobile communications device according to claim 5, wherein the mobile communications device is configured to register with a presence server in the IP multimedia subsystem network during which presence information including the UPnP vehicle profile and user identity are published to the presence server, wherein a plurality of application servers have subscribed to receive the UPnP vehicle profile and user identity from the presence server such that independent communications sessions do not need to be established between the mobile communications device and each of the application servers to exchange the UPnP vehicle profile.

15. The non-transitory computer-readable storage medium according to claim 11, wherein the computer program product further comprises computer program segments that when executed on the computer enables the mobile communications device to register the mobile communications device with a presence server in the IP multimedia subsystem network during which presence information including the UPnP vehicle profile and user identity are published to the presence server, wherein a plurality of application servers have subscribed to receive the UPnP vehicle profile and user identity from the presence server such that independent communications sessions do not need to be established between the mobile communications device and each of the application servers to exchange the UPnP vehicle profile.

* * * * *